(12) United States Patent
Liao et al.

(10) Patent No.: US 11,732,097 B2
(45) Date of Patent: Aug. 22, 2023

(54) LOW SHRINKAGE LOW OLIGOMER POLYESTER FILM AND METHOD FOR MANUFACTURING THE SAME

(71) Applicant: NAN YA PLASTICS CORPORATION, Taipei (TW)

(72) Inventors: Te-Chao Liao, Taipei (TW); Wen-Cheng Yang, Taipei (TW); Wen-Jui Cheng, Taipei (TW); Chia-Yen Hsiao, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 359 days.

(21) Appl. No.: 17/034,279

(22) Filed: Sep. 28, 2020

(65) Prior Publication Data
US 2021/0253809 A1 Aug. 19, 2021

(30) Foreign Application Priority Data
Feb. 19, 2020 (TW) ................... 109105315

(51) Int. Cl.
*C08J 5/18* (2006.01)
*C08K 13/08* (2006.01)
(Continued)

(52) U.S. Cl.
CPC ............. *C08J 5/18* (2013.01); *B29C 48/0018* (2019.02); *B29C 48/022* (2019.02); *B29C 48/08* (2019.02);
(Continued)

(58) Field of Classification Search
CPC ...... C08J 5/18; C08J 2367/00; C08J 2367/02; C08J 2369/00; B29C 48/0018; B29C 48/022; B29C 48/08; B29C 55/005; B29C 55/16; B29C 48/21; B29C 48/49; B29C 48/914; B29C 48/40; B29C 55/12; B32B 27/08; B32B 27/36; B32B 2307/518; B32B 2250/03; B32B 2250/244; B32B 2264/10; B32B 2264/105; B32B 27/365;
(Continued)

(56) References Cited

U.S. PATENT DOCUMENTS

| 5,795,528 A * | 8/1998 | Klein ...................... B32B 27/36 264/235 |
| 2006/0270806 A1* | 11/2006 | Hale ....................... C08L 69/00 525/445 |

FOREIGN PATENT DOCUMENTS

| JP | 2010221412 A | 10/2020 |
| JP | 2010221413 A | 10/2020 |

(Continued)

*Primary Examiner* — Nathan L Van Sell
(74) *Attorney, Agent, or Firm* — Li & Cai Intellectual Property (USA) Office

(57) ABSTRACT

A low shrinkage low oligomer polyester film and a method for manufacturing the same are provided. The method includes forming at least one polyester composition into an unstretched polyester thick film and stretching the unstretched polyester thick film in a machine direction (MD) and a transverse direction (TD) at a stretch ratio of two to six times. The polyester composition includes 94% to 99.974% by weight of a polyester resin, 0.01% to 1% by weight of a primary antioxidant, 0.01% to 1% by weight of a secondary antioxidant, 0.003% to 2% by weight of a nucleating agent, and 0.003% to 2% by weight of a flow aid. The polyester resin has an intrinsic viscosity between 0.60 dl/g and 0.80 dl/g.

12 Claims, 3 Drawing Sheets

(51) Int. Cl.

| | | |
|---|---|---|
| *B29C 55/00* | (2006.01) | |
| *B29C 55/16* | (2006.01) | |
| *B29C 48/00* | (2019.01) | |
| *B32B 27/08* | (2006.01) | |
| *B32B 27/36* | (2006.01) | |
| *B29C 48/08* | (2019.01) | |
| *B29K 67/00* | (2006.01) | |
| *B29L 7/00* | (2006.01) | |

(52) U.S. Cl.
CPC ............ *B29C 55/005* (2013.01); *B29C 55/16* (2013.01); *B32B 27/08* (2013.01); *B32B 27/36* (2013.01); *C08K 13/08* (2013.01); *B29K 2067/00* (2013.01); *B29L 2007/008* (2013.01); *B32B 2307/518* (2013.01); *C08J 2367/00* (2013.01)

(58) Field of Classification Search
CPC .............. B32B 2264/101; B32B 27/18; B32B 2250/02; B32B 2264/102; B32B 2264/104; B32B 2264/108; B32B 2264/12; B32B 2307/306; B32B 2307/704; B32B 2307/732; B32B 2307/734; B32B 2307/736; B32B 2307/746; B32B 2457/10; B32B 27/06; C08K 13/08; C08K 3/36; C08K 5/005; C08K 5/0083; C08K 2201/014; B29K 2067/00; B29L 2007/008
See application file for complete search history.

(56) References Cited

FOREIGN PATENT DOCUMENTS

| | | |
|---|---|---|
| TW | 200827403 A | 7/2008 |
| TW | I499626 B | 9/2015 |

* cited by examiner

1

LOW SHRINKAGE LOW OLIGOMER POLYESTER FILM AND METHOD FOR MANUFACTURING THE SAME

CROSS-REFERENCE TO RELATED PATENT APPLICATION

This application claims the benefit of priority to Taiwan Patent Application No. 109105315, filed on Feb. 19, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a polyester film, and more particularly to a low shrinkage low oligomer polyester film and a manufacturing method for the same.

BACKGROUND OF THE DISCLOSURE

Polyesters, for example, polyethylene terephthalate, polyethylene 2,6-naphthalene dicarboxylate, etc., exhibit good performances in terms of moldability, mechanical properties, thermal properties, electrical properties, chemical resistance, and so forth. Accordingly, polyesters can be used for different purposes, such as being used as an optical film, an electrical insulating film, a barrier film, a release film, a protective film, an agricultural film, a packaging material, and a heat insulation film.

However, when a polyester film is used as part of a device or is processed in a high temperature environment, the polyester film is prone to not only bleaching but also cracking, and has obvious thermal contraction characteristics such that a size of the film is unstable. Furthermore, a large amount of oligomer may possibly precipitate on a surface of the film, and the above-mentioned conditions may limit the application of the polyester film.

SUMMARY OF THE DISCLOSURE

In response to the above-referenced technical inadequacies, the present disclosure provides a low shrinkage low oligomer polyester film, which can be used in high temperatures, and a manufacturing method for the same.

In one aspect, the present disclosure provides a manufacturing method of a low shrinkage low oligomer polyester film, which includes the steps of forming at least one polyester composition into an unstretched polyester thick film and stretching the unstretched polyester thick film in a machine direction (MD) and a transverse direction (TD) at a stretching ratio of 2 to 6 times. The polyester composition includes 94% to 99.974% by weight of a polyester resin, 0.01% to 1% by weight of a primary antioxidative ingredient, 0.01% to 1% by weight of a secondary antioxidative ingredient, 0.003% to 2% by weight of a nucleating agent, and 0.003% to 2% by weight of a flow aid. The polyester resin has an intrinsic viscosity between 0.60 dl/g and 0.80 dl/g.

In one embodiment, pre-shrinking is performed on a biaxially stretched polyester film in the transverse direction and/or the machine direction.

In one embodiment, the unstretched polyester film is sequentially stretched in the machine direction (MD) and the transverse direction (TD), a stretch in the machine direction (MD) is performed at a temperature from 70° C. to 145° C., and a stretch in the transverse direction (TD) is performed at a temperature from 90° C. to 160° C.

In one embodiment, the unstretched polyester film is simultaneously stretched in the machine direction (MD) and the transverse direction (TD) at a stretch ratio of 2 to 6 times and at a temperature from 70° C. to 160° C.

In one embodiment, the manufacturing method of a low shrinkage low oligomer polyester film further comprises: before forming the unstretched polyester thick film, performing a crystallizing and drying process on the at least one polyester composition at a temperature from 120° C. to 180° C.

In one embodiment, a process time of the crystallizing and drying process is between 3 and 8 hours.

In one embodiment, the polyester composition further includes 0.5 to 2% by weight of slipping agent particles each having a particle size between 1 μm and 5 μm.

In one embodiment, wherein the polyester resin has an intrinsic viscosity between 0.65 dl/g and 0.78 dl/g.

In another aspect, the present disclosure provides a low shrinkage low oligomer polyester film, which includes a substrate layer and at least one surface layer. The at least one surface layer is formed on at least one surface of the substrate layer, and the substrate layer and the at least one surface layer are each formed of a polyester composition. The polyester composition includes 94% to 99.974% by weight of a polyester resin, 0.01% to 1% by weight of a primary antioxidative ingredient, 0.01% to 1% by weight of a secondary antioxidative ingredient, 0.003% to 2% by weight of a nucleating agent, and 0.003% to 2% by weight of a flow aid. The polyester resin has an intrinsic viscosity between 0.60 dl/g and 0.80 dl/g.

In one embodiment, the polyester composition forming the at least one surface layer further includes 0.02% to 5% by weight of slipping agent particles each having a particle size between 1 μm and 5 μm.

In one embodiment, the polyester resin has an intrinsic viscosity between 0.65 dl/g and 0.78 dl/g.

In one embodiment, a thickness of the low shrinkage low oligomer polyester film is between 15 μm and 350 μm, and a thickness of the at least one surface layer is 2% to 30% of the thickness of the low shrinkage low oligomer polyester film.

In one embodiment, the low shrinkage low oligomer polyester film has a thermal shrinkage rate less than 1% in each of the machine direction (MD) and the transverse direction (TD) at a temperature of 210° C.

In one embodiment, a thickness of the low shrinkage low oligomer polyester film is between 15 μm and 350 μm, and a thickness of the at least one surface layer is 2% to 30% of the thickness of the low shrinkage low oligomer polyester film.

In one embodiment, a thickness of the at least one surface layer is 3% to 20% of the thickness of the low shrinkage low oligomer polyester film.

In one embodiment, a thickness of the at least one surface layer is 4% to 15% of the thickness of the low shrinkage low oligomer polyester film.

One of the beneficial effects of the present disclosure is that, through the technical solutions of "the substrate layer and the surface layer are each formed of a polyester composition that includes specific amounts of a polyester resin, a primary antioxidative ingredient, a secondary antioxidative ingredient, a nucleating agent and a flow aid, and the polyester resin has an intrinsic viscosity between 0.60 dl/g and 0.80 dl/g," the low shrinkage low oligomer polyester film of the present disclosure is capable of preventing oligomers from precipitating on a film surface in a high temperature environment.

The manufacturing method of the low shrinkage low oligomer polyester film of the present disclosure, which is to pre-shrink the low shrinkage low oligomer polyester film in the machine and transverse directions under specific stretch conditions before performing a stretch process, allows the low shrinkage low oligomer polyester film thus produced to have very low heat shrinkage rates of the machine and transverse directions in a high temperature environment, and have a variation in haze (Δhaze) less than 1%.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
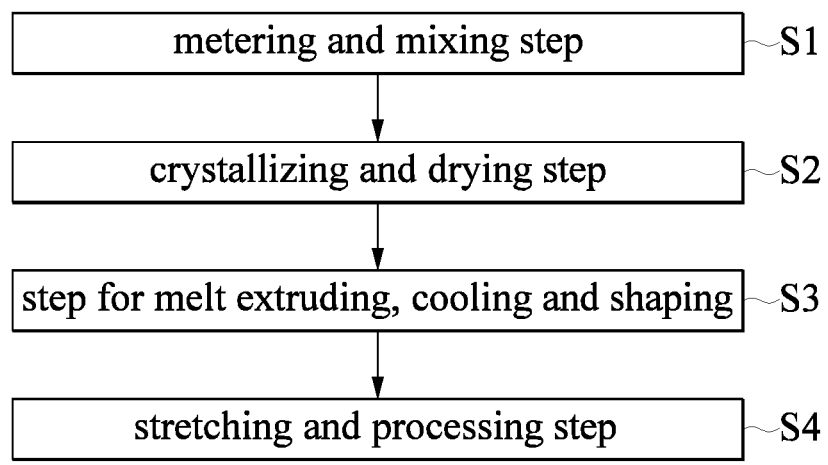
FIG. 1 is a flowchart of a manufacturing method of a low shrinkage low oligomer polyester film of the present disclosure.

Polyester films have a wide range of uses. In consideration of mechanical, electrical, and thermal properties, the polyester films can serve as barrier films for batteries (e.g., automotive batteries, fuel cells, and lithium batteries), mold-releasing films for pressing molds, high temperature resistant release films and matte films for hot pressing. Therefore, the present disclosure provides a technical solution that is capable of improving heat resistance and dimensional stability of the polyester film and can suppress the precipitation of polyester oligomers.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Unless defined otherwise, all technical and scientific terms used herein have the same meanings as commonly understood by one of ordinary skill in the art to which this invention belongs. As used herein, the singular forms "a," "an," and "the," are intended to include the plural forms.

Unless indicated otherwise, all percentages disclosed herein are weight percentages. When a range of upper and lower limits is provided, all combinations in the mentioned range are covered by the scope of the present disclosure as if the combinations were individually listed.

Referring to FIG. 1, a manufacturing method of a low shrinkage low oligomer polyester film mainly includes: step S1, i.e., a metering and mixing step, of metering and mixing all required ingredients to form at least one polyester composition; step S2, i.e., a crystallizing and drying step, of performing a crystallizing and drying process at a temperature from 120° C. to 180° C. on the polyester composition; step S3, i.e., a step for melt extrusion, cooling and shaping, of melting and extruding the polyester composition, and then casting and cooling the resulting extrudate to obtain an unstretched polyester thick film; and step S4, i.e., a stretching and processing step, of preheating and stretching the unstretched polyester thick film, and then heat shrinking (also called "preshrinking") the resulting stretched low shrinkage low oligomer polyester film in a transverse direction and/or a machine direction.

In order to provide properties required for a target object, the polyester composition includes 94% to 99.974% by weight of a polyester resin, 0.01% to 1% by weight of a primary antioxidative ingredient, 0.01% to 1% by weight of a secondary antioxidative ingredient, 0.003% to 2% by weight of a nucleating agent, and 0.003% to 2% by weight of a flow aid. It is worth mentioning that a formula of the polyester composition can directly produce the technical effects of suppressing the precipitation of polyester oligomers.

More specifically, the polyester resin may be formed by one or more diacids and one or more diols. The diacid(s) may be an aromatic diacid, an alicyclic diacid, or a combination thereof. The diol(s) may be an aromatic diol, an aliphatic diol, an alicyclic diol or a combination thereof.

Specific examples of the aromatic diacid include terephthalic acid, isophthalic acid, phthalic acid, naphthalene dicarboxylic acid, diphenyl sulfone dicarboxylic acid, diphenyl ether dicarboxylic acid, diphenyl ketone dicarboxylic acid, phenylindane dicarboxylic acid, sodium isophthalate sulfonate, and dibromoterephthalic acid. Specific examples of the alicyclic diacid include oxalic acid, succinic acid, adipic acid, azelaic acid, sebacic acid, and dimer acid. The diol(s) may be an aromatic diol, an aliphatic diol, an alicyclic diol, or any combination thereof.

Specific examples of the aromatic diol include naphthalenediol, 2,2-bis(4-hydroxydiphenyl)propane, 2,2-bis(4-hydroxyethoxyphenyl)propane, bis(4-hydroxyphenyl) sulfone, and hydroquinone. Specific examples of the aliphatic diol include ethylene glycol, propylene glycol, 1,4-butanediol, hexanediol, neopentyl glycol, and diethylene glycol. Specific examples of the alicyclic diol include cyclohexanedimethanol and cyclohexanediol.

In certain embodiments, the polyester resin may be selected from polyethylene terephthalate (PET), polytrimethylene terephthalate (PPT), polybutylene terephthalate (PBT), polyethylene naphthalate (PEN), polybutylene naphthalate (PBN), polycyclohexylenedimethylene terephthalate (PCT), polycarbonate (PC) or polyarylate, and preferably PET. The polyester resin has an intrinsic viscosity between 0.60 dl/g and 0.80 dl/g, and preferably between 0.65 dl/g and 0.78 dl/g. Accordingly, loads (e.g., loads caused by a surrounding environment and external forces) on the polyester resin when being shaped can be reduced. Furthermore, during processing, the heat generated by a shearing force can be reduced, so as to avoid thermal decomposition of the polyester resin.

It is worth mentioning that, the primary antioxidant and the secondary antioxidant can produce a synergistic effect so as to provide better antioxidative effect. More specifically, the primary antioxidant can quickly react with peroxy radicals (ROO·) to stop free radical chain reactions. The secondary antioxidant can react with hydroperoxides (ROOH) to convert them into substances that are free of free radicals and non-reactive. The primary antioxidant may be selected from phenolic compounds or amine compounds, which are exemplified by commercially available products with trade names of Irganox 1010, Irganox 1425, Irganox 245, Anox 1315, Anox PP18, Anox 20, Lowinox 1790, Lowinox TBM-68, and Naugard 445. The secondary antioxidant may be selected from phosphorous compounds or thioester compounds, which are exemplified by commercially available products with trade names of Sandostab P-EPQ, Irgafos 168, and Naugard 412S.

The nucleating agent can increase total crystallinity and improve the heat resistance of a low shrinkage low oligomer polyester film. Furthermore, the nucleating agent can promote crystal growth, which results in fine crystals, reduces the formation of large spherulites, and avoids the embrittlement of film surfaces. The nucleating agent may be a mineral material, a metal oxide, a silicon compound, a metal salt of an organic or inorganic acid, a phosphate ester metal salt, a polyol derivative, a sulfonylimide compound, a glass powder, a metal powder, or any combination thereof. Specific examples of the mineral material include graphite, talc and, kaolin. Specific examples of the metal oxide include zinc oxide, aluminum oxide, and magnesium oxide. Specific examples of the silicon compound include silicon oxide, calcium silicate, and magnesium silicate. Specific examples of the metal salt of an organic or inorganic acid include metal carbonates such as magnesium carbonate, calcium carbonate, sodium carbonate and potassium carbonate, barium sulfate, calcium sulfate, sodium benzoate, and aluminum p-tert-butylbenzoate. The phosphate ester metal salt is exemplified by an aromatic phosphate ester metal salt. The polyol derivative is exemplified by dibenzylidene sorbitol.

In consideration of heat resistance, the nucleating agent is preferably an inorganic material.

The flow aid can effectively reduce mechanical torque on a polyester material when melt-extruding, and can reduce molecular chain scission of a polymer. The flow aid can be pentaerythritol stearate (PETS) or its analogues, which have good thermal stability, low volatility, and good mold release and flow properties at high temperatures, and allow good nucleation effect on a partial crystalline polyester.

The polyester composition further includes 0.02% to 0.5% by weight of slipping agent particles. The slipping agent particles can increase the heat resistance of a low shrinkage low oligomer polyester film, and can hinder the movement of oligomers so as to prevent oligomers from precipitating on a film surface. The slipping agent particles can have a particle size between 1 μm and 5 μm, preferably 1.5 μm.

The detailed steps in the manufacturing method of the present disclosure are specifically described as follows.

Step S1 is a metering and mixing step, in which general masterbatches respectively required by a substrate layer and a surface layer are uniformly mixed with at least one additive (e.g., a nucleating agent) of the functionally modified polyester grains in a metered manner Thus, mixed polyester materials of the substrate layer and the surface layer are obtained. In practice, the at least one additive of the functionally modified polyester grains can be added in a polymerization or a blending process.

Step S2 is a crystallizing and drying step, in which a crystallizing and drying process at a temperature from 120° C. to 180° C. is performed on a polyester material (i.e., a polyester composition), so that the polyester material has a water content less than 30 ppm. The process time of the crystallizing and drying process can be from 3 to 8 hours, but it is not limited thereto.

Step S3 is a step for melt extrusion, cooling and shaping, in which the polyester material is melt-extruded and the resulting extrudate is cooled and shaped to form an unstretched polyester thick film More specifically, the polyester material can be formed into a fluid melt in a single-layered extrusion or multi-layered co-extrusion manner, which can be achieved by a twin screw extruder. After that, the melt is cast into a film to form between casting rolls and cooled for solidification. However, these details are provided for exemplary purposes only and are not meant to limit the scope of the present disclosure.

The step S4 is a stretching and processing step, in which the unstretched polyester thick film is preheated and stretched, and then the resulting stretched low shrinkage low oligomer polyester film is heat shrunk in the transverse direction and/or the machine direction. In practice, a sequential or simultaneous biaxial stretching process can be used in step S4. It is worth mentioning that, under specific stretch conditions, a crystal orientation of the low shrinkage low oligomer polyester film can be completed, and the low shrinkage low oligomer polyester film can have a very low thermal shrinkage rate in both the machine direction and the transverse direction in a high temperature environment.

More specifically, the unstretched polyester thick film is stretched in the machine direction (MD) (also called a "length direction") at a stretch ratio from 2 to 6 times and a temperature from 70° C. to 145° C. to form a uniaxially stretched low shrinkage low oligomer polyester film. The uniaxially stretched low shrinkage low oligomer polyester film is then stretched in the transverse direction (TD) (also called a "width direction") at a stretch ratio from 2 to 6 times and a temperature from 90° C. to 160° C. to form a biaxially stretched low shrinkage low oligomer polyester film According to practical requirements, the stretching processes in the machine direction and the transverse direction can be performed in a reverse order. The stretching process of the low shrinkage low oligomer polyester film can be realized by a conventional stenter but is not limited thereto.

Furthermore, the unstretched polyester thick film can be simultaneously and biaxially stretched. More specifically, the unstretched polyester thick film can be simultaneously stretched in the machine direction and the transverse direction at a stretch ratio from 2 to 6 times and a temperature from 70° C. to 160° C., so as to directly form the biaxially stretched low shrinkage low oligomer polyester film.

It is worth mentioning that, step S4 includes heat shrinking the biaxially stretched low shrinkage low oligomer polyester film in the transverse direction and/or the machine direction, which can increase the crystallinity of the low shrinkage low oligomer polyester film and improve the shrinkage stress of the low shrinkage low oligomer polyester film More specifically, in the heat shrinking process, two ends of the low shrinkage low oligomer polyester film in the width or the length direction can be clamped by clamping fixtures, so that the low shrinkage low oligomer polyester film can be repeatedly stretched and relaxed. The extent of every stretching action is 500% and the extent of every relaxing action is 10%. Therefore, the thermal shrinkage of the low shrinkage low oligomer polyester film at high temperatures can be effectively suppressed. That is, the thermal dimensional stability of the low shrinkage low oligomer polyester film can be increased without any additional heat treatment after the stretching process.

Figure 2:
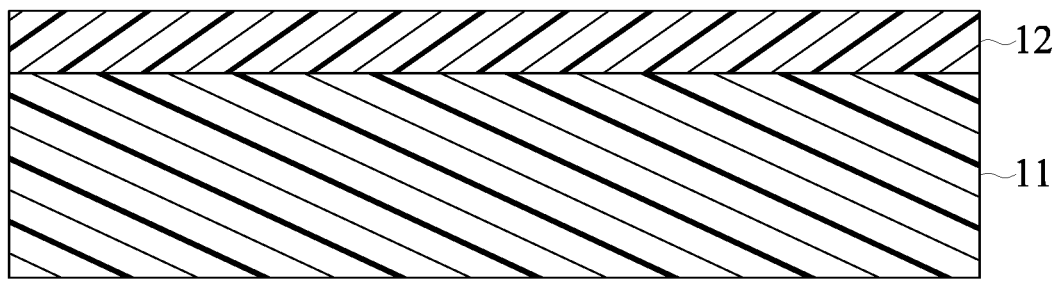
FIG. 2 is a structural schematic view of a low shrinkage low oligomer polyester film of the present disclosure.
Figure 3:
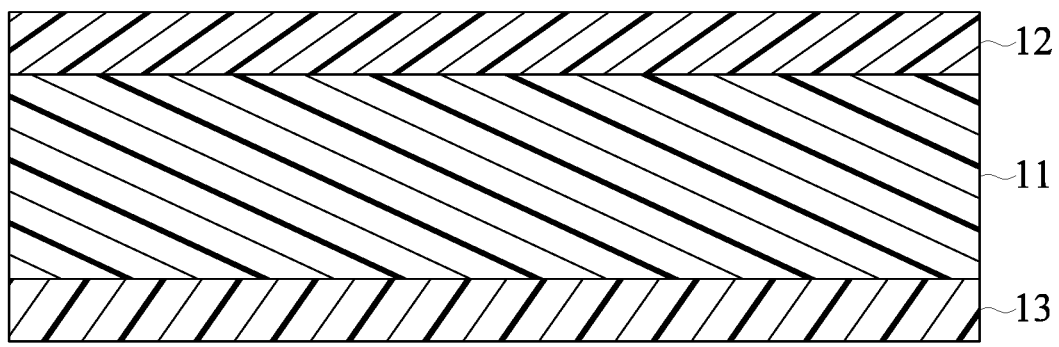
FIG. 3 is another structural schematic view of a low shrinkage low oligomer polyester film of the present disclosure.

Reference is made to FIG. 2 and FIG. 3, in which a polyester film 1 (hereinafter referred to as "low shrinkage low oligomer polyester film") obtained by the manufacturing method of the present disclosure can include a substrate layer 11 and a first surface layer 12 formed on a surface (e.g., an upper surface) of the substrate layer 11, as shown in FIG. 2. Alternatively, the low shrinkage low oligomer polyester film 1 can include a substrate layer 11, a first surface layer 12 formed on a surface (e.g., an upper surface) of the substrate layer 11, and a second surface layer 13 formed on another opposite surface (e.g., a lower surface) of the substrate layer 11, as shown in FIG. 3. In an alternative embodiment (not shown), the low shrinkage low oligomer polyester film 1 can be a single-layered structure.

More specifically, the substrate layer 11 includes 94% to 99.974% by weight of a polyester resin, 0.01% to 1% by weight of a primary antioxidative ingredient, 0.01% to 1% by weight of a secondary antioxidative ingredient, 0.003% to 2% by weight of a nucleating agent, and 0.003% to 2% by weight of a flow aid. The polyester resin has an intrinsic viscosity between 0.60 dl/g and 0.80 dl/g, and preferably between 0.65 dl/g and 0.78 dl/g. In consideration of heat resistance and suppression of oligomer precipitation, the first surface layer 12/the second surface layer 13 further include 0.02% to 0.5% by weight of slipping agent particles, each of which has a particle size between 1 μm and 5 μm, preferably 1.5 μm.

The total thickness of the low shrinkage low oligomer polyester film 1 is between 15 μm and 350 μm, and the thickness of the first surface layer 12 and the thickness of the second surface layer 13 are respectively 2% to 30% of the total thickness of the low shrinkage low oligomer polyester film 1, preferably 3% to 20%, and more preferably 4% to 15%. Therefore, the low shrinkage low oligomer polyester film 1 has good film haze and good effect on suppressing the movement of oligomers. If the thickness ratio of the first or second surface layer 12, 13 relative to the total thickness of the low shrinkage low oligomer polyester film 1 is less than 2%, the oligomers would easily move to a surface of the film Thus, once the low shrinkage low oligomer polyester film 1 is heated, a large amount of cyclic oligomer(s) would precipitate on the surface of the film, affecting the appearance of the film. If the thickness ratio of the first or second surface layer 12, 13 relative to the total thickness of the low shrinkage low oligomer polyester film 1 exceeds 30%, although the low shrinkage low oligomer polyester film 1 has a good effect on suppressing the movement of oligomers to the surface of the film, the film haze may increase and cause insufficient transparency.

[Property Evaluation]

Low shrinkage low oligomer polyester films of Examples 1 to 5 and Comparative Examples 1 and 5 are obtained by steps S1 to S4 mentioned above, and processing conditions for each step are as shown in Table 1. The low shrinkage low oligomer polyester films all have an A/B/A structure (three-layered structure) as shown in FIG. 3, in which A represents the surface layer and B represents the substrate layer. The thickness of each layer is shown in Table 1. Also, for each layer, the intrinsic viscosity of a polyester masterbatch and the concentration of functional additives are shown in Table 1. The low shrinkage low oligomer polyester films are tested for key physical properties by the following test methods, and the results are as shown in Table 1.

Test of Visible Light Transmittance and Haze:

A testing device (model name "TC-HIII DPK", produced by Tokyo Denshoku Co., Ltd., Japan) was used to test the visible light transmittance and haze value of the low shrinkage low oligomer polyester films of Examples 1 to 5 and Comparative Examples 1 and 5 in accordance with a JIS K7705 standard before and after being heated. Also, a variation in haze (Δhaze) of each of the low shrinkage low oligomer polyester films was calculated. In this test, an oven is used for heating and the heating temperature is at 210° C. for 3 hours.

Test of Thermal Shrinkage Properties:

The low shrinkage low oligomer polyester films of Examples 1 to 5 and Comparative Examples 1 and 5 were each cut into a square shape of 15 cm×15 cm. After being heated in the oven at 210° C. for 3 hours, the lengths of the low shrinkage low oligomer polyester films in the machine direction (MD) and the transverse direction (TD) were measured. Also, the variation in each of the length after being heated was calculated. The thermal shrinkage rates of the lengths of the low shrinkage low oligomer polyester films in the machine direction (MD) and the transverse direction (TD) can be obtained by the following ways: dividing each of the measured length variations in the machine direction (MD) by the original length (i.e., 15 cm) and then multiplying by 100%, and dividing each of the measured length variations in the transverse direction (TD) by the original length (i.e., 15 cm) and then multiplying by 100%.

Test of Film IV Properties:

A testing device (model name "SI Analytics AVSPRO3 IV") was used to test the film IV properties. Each of low shrinkage low oligomer polyester film samples of Examples 1 to 5 and Comparative Examples 1 and 5 was weighted 125 mg, and then was placed into a wide mouth bottle with a capacity of 100 ml. Next, 25 ml of IV solvent was added into the wide mouth bottle, and were heated and stirred on a heat plate at a temperature of 122° C. After the low shrinkage low oligomer polyester film samples were completely dissolved in the solvent, the film IV properties were measured.

TABLE 1

| | Items | Comparative Example 1 | Comparative Example 2 | Comparative Example 3 | Comparative Example 4 | Comparative Example 5 |
|---|---|---|---|---|---|---|
| Film | Total thickness (μm) | 125 | 125 | 125 | 125 | 125 |
| | Co-extruded structure | A/B/A | A/B/A | A/B/A | A/B/A | A/B/A |
| | Thickness of each layer (μm) | 6/113/6 | 6/113/6 | 6/113/6 | 6/113/6 | 6/113/6 |
| Ingredients of A layer | Silica particles having an average particle size of 2 μm (ppm) | 1000 | 1000 | 1000 | 1000 | 1000 |
| | Primary antioxidant (ppm) | — | 5000 | — | — | 5000 |
| | Secondary antioxidant (ppm) | — | 5000 | — | — | 5000 |
| | Nucleating agent (ppm) | — | — | 1500 | — | — |
| | Flow aid (ppm) | — | — | — | 1500 | 1500 |
| Ingredients of B layer | Primary antioxidant (ppm) | — | 5000 | — | — | 5000 |
| | Secondary antioxidant (PPm) | — | 5000 | — | — | 5000 |
| | Nucleating agent (PPm) | — | — | 1500 | — | — |
| | Flow aid (ppm) | — | — | — | 1500 | 1500 |
| Processing conditions | Drying temperature of crystallization (°C./hours) | 140/4 | 140/4 | 140/4 | 140/4 | 140/4 |
| | Temperature of extruder (°C.) | 295 | 295 | 295 | 295 | 295 |
| | Stretching temperature of machine direction (°C.) | 94 | 94 | 94 | 94 | 94 |
| | Stretch ratio of machine direction | 3.3 | 3.3 | 3.3 | 3.3 | 3.3 |
| | Stretching temperature of transverse direction (°C.) | 110 | 110 | 110 | 110 | 110 |
| | Stretch ratio of transverse direction | 4.0 | 4.0 | 4.0 | 4.0 | 4.0 |
| | Pre-shrinkage rate of machine direction (%) | — | — | — | — | — |
| | Pre-shrinkage rate of transverse direction (%) | 0.5 | 0.5 | 0.5 | 0.5 | 0.5 |
| Materials | Average IV of polyester masterbatch | 0.8 | 0.8 | 0.8 | 0.8 | 0.8 |
| Film properties | IV | 0.60 | 0.65 | 0.61 | 0.63 | 0.69 |
| | ΔIV | 0.2 | 0.15 | 0.19 | 0.17 | 0.11 |
| | Shrinkage rate of machine direction (%) | 2.0 | 1.98 | 1.99 | 2.00 | 1.58 |
| | Shrinkage rate of transverse direction (%) | 1.02 | 1 | 1.01 | 1.01 | 0.92 |
| | Film haze (%) | 1.65 | 1.55 | 1.55 | 1.62 | 1.55 |
| | Film haze after being heated for 3 hours at a temperature of 210° C. (%) | 15 | 12.5 | 10.21 | 14.2 | 8.92 |
| | Variation in haze (ΔHaze) (%) | 13.35 | 10.95 | 8.66 | 12.58 | 7.37 |
| | Light transmittance (TT %) | 87 | 87.2 | 87.2 | 87.2 | 87.1 |

TABLE 2

| | Items | Example 1 | Example 2 | Example 3 | Example 4 | Example 5 |
|---|---|---|---|---|---|---|
| Film | Total thickness (μm) | 15 | 50 | 125 | 250 | 350 |
| | Co-extruded structure | A/B/A | A/B/A | A/B/A | A/B/A | A/B/A |
| | Thickness of each layer (μm) | 2/11/2 | 2/46/2 | 6/113/6 | 12/226/12 | 18/314/18 |
| Ingredients of A layer | Silica particles having an average particle size of 2 μm (ppm) | 1000 | 500 | 500 | 600 | 500 |
| | Primary antioxidant (ppm) | 3000 | 8000 | 5000 | 1500 | 200 |
| | Secondary antioxidant | 3000 | 8000 | 5000 | 1500 | 200 |

TABLE 2-continued

| | Items | Example 1 | Example 2 | Example 3 | Example 4 | Example 5 |
|---|---|---|---|---|---|---|
| | Nucleating agent (ppm) | 30 | 500 | 1500 | 3000 | 3000 |
| | Flow aid (ppm) | 30 | 500 | 1500 | 3000 | 3000 |
| Ingredients of B layer | Primary antioxidant (ppm) | 3000 | 8000 | 5000 | 1500 | 200 |
| | Secondary antioxidant (ppm) | 3000 | 8000 | 5000 | 1500 | 200 |
| | Nucleating agent (ppm) | 30 | 500 | 1500 | 3000 | 3000 |
| | Flow aid (ppm) | 30 | 500 | 1500 | 3000 | 3000 |
| Processing conditions | Drying temperature of crystallization (° C./hours) | 140/4 | 140/4 | 140/4 | 140/4 | 140/4 |
| | Temperature of extruder (° C.) | 295 | 295 | 295 | 295 | 295 |
| | Stretching temperature of machine direction (° C.) | 90 | 92 | 94 | 95 | 95 |
| | Stretch ratio of machine direction | 3.8 | 3.5 | 3.3 | 3.1 | 2.9 |
| | Stretching temperature of transverse direction (° C.) | 110 | 110 | 110 | 115 | 115 |
| | Stretch ratio of transverse direction | 4.5 | 4.3 | 4.0 | 3.5 | 3.3 |
| | Pre-shrinkage rate of machine direction (%) | 1.8 | 1.8 | 1.8 | 1.8 | 1.8 |
| | Pre-shrinkage rate of transverse direction (%) | 0.5 | 0.5 | 0.5 | 0.5 | 0.5 |
| Materials | Average IV of polyester masterbatch | 0.75 | 0.73 | 0.74 | 0.78 | 0.79 |
| Film properties | IV | 0.68 | 0.68 | 0.68 | 0.68 | 0.68 |
| | ΔIV | 0.07 | 0.05 | 0.06 | 0.1 | 0.11 |
| | Shrinkage rate of machine direction (%) | 0.75 | 0.85 | 0.82 | 0.45 | 0.42 |
| | Shrinkage rate of transverse direction (%) | 0.65 | 0.68 | 0.72 | 0.42 | 0.36 |
| | Film haze (%) | 0.42 | 0.6 | 1.5 | 2.65 | 3.25 |
| | Film haze after being heated for 3 hours at a temperature of 210° C. (%) | 0.85 | 1.05 | 2.1 | 3.2 | 3.9 |
| | Variation in haze (ΔHaze) (%) | 0.43 | 0.45 | 0.6 | 0.55 | 0.65 |
| | Light transmittance (TT %) | 89.5 | 89.2 | 89.1 | 89.5 | 89 |

In view of the above, each of low shrinkage low oligomer polyester film samples of Examples 1 to 5 includes a primary antioxidative ingredient, a secondary antioxidative ingredient, a nucleating agent, and a flow aid, so that an optimal synergistic effect of low oligomer products can be achieved.

In each of the low shrinkage low oligomer polyester film samples of Examples 1 to 5, the surface layer compositions can produce the following technical effects. A polyester resin has an intrinsic viscosity between 0.60 dl/g and 0.80 dl/g. A synergistic antioxidative effect can be achieved with the presence of 0.01% to 1% by weight of a primary antioxidative ingredient and 0.01% to 1% by weight of a secondary antioxidative ingredient, with molecular chain scission of polymers being reduced and oligomers being prevented from formation. A nucleating agent with an amount of 0.003% to 2% by weight can increase total crystallinity, improve the heat resistance of a low shrinkage low oligomer polyester film, hinder the movement of oligomers, and prevent oligomers from precipitating on a film surface. Furthermore, the nucleating agent can promote crystal growth, which results in fine crystals, reduces the formation of large spherulites, and avoids the embrittlement of film surfaces. A flow aid with an amount of 0.003% to 2% by weight can effectively reduce mechanical torque on a polyester material when melt-extruding, and can reduce molecular chain scission of a polymer.

After the pre-shrinking treatment in the machine direction (MD) and in the transverse direction (TD), the products of low shrinkage low oligomer polyester film samples of Examples 1 to 5 can have an increase in crystallinity and a release in shrinkage stress. The results revealed that the low shrinkage low oligomer polyester film formula has four additives, namely a primary antioxidative ingredient, a secondary antioxidative ingredient, a nucleating agent, and a flow aid, which can effectively prevent the oligomers of low shrinkage low oligomer polyester film from formation. With the aforementioned pre-shrinking treatment, the produced low shrinkage low oligomer polyester films heated at a temperature of 210° C. for 3 hours have a thermal shrinkage rate less than 1% in each of the machine direction (MD) and the transverse direction (TD). Also, the variation in haze (Δhaze) is less than 1%, realizing the effect of low shrinkage low oligomer polyester films.

Low shrinkage low oligomer polyester films of Examples 1 to 5 include a nucleating agent, and have an apparently lower thermal shrinkage rate in each of the machine direction (MD) and the transverse direction (TD) than the low shrinkage low oligomer polyester films of Comparative Examples. Furthermore, the higher the concentration of nucleating agent, the lower the thermal shrinkage rate of low shrinkage low oligomer polyester films.

Low shrinkage low oligomer polyester films of Comparative Example 1 received no pre-shrinkage treatment in the machine direction (MD). The measured thermal shrinkage rate in the machine direction (MD) and the transverse direction (TD) are apparently higher (with a shrinkage rate in the machine direction (MD) being 2.0%, and a shrinkage rate in the transverse direction (TD) being 1.02%). Furthermore, none of the four additives, namely a primary antioxidative ingredient, a secondary antioxidative ingredient, a nucleating agent, and a flow aid, was added in the low shrinkage low oligomer polyester films of Comparative Example 1. After the produced low shrinkage low oligomer polyester films were heated at a temperature of 210° C. for 3 hours, the variation in haze (Δ haze) reached 13.35%, and the film surface significantly turns hazy. Furthermore, the low shrinkage low oligomer polyester film products have poor properties in heat resistance. The instability of size after being heated makes the low shrinkage low oligomer polyester film products unable to be used.

Low shrinkage low oligomer polyester films of Comparative Example 2 received no pre-shrinkage treatment in the machine direction (MD). The measured thermal shrinkage rate in the machine direction (MD) and the transverse direction (TD) are apparently higher (with a shrinkage rate in the machine direction (MD) being 1.98%, and a shrinkage rate in the transverse direction (TD) being 1.0%). Furthermore, only 500 ppm of a primary antioxidative ingredient and 500 ppm of a secondary antioxidative ingredient were added in the low shrinkage low oligomer polyester films of Comparative Example 2. The improvement of heat resistance is not significant. After the produced low shrinkage low oligomer polyester films were heated at a temperature of 210° C. for 3 hours, the variation in haze (Δ haze) reached 10.95%, and the film surface significantly turns hazy. Furthermore, the low shrinkage low oligomer polyester film products have poor properties in heat resistance. The instability of size after being heated limits the application of low shrinkage low oligomer polyester film products.

Low shrinkage low oligomer polyester films of Comparative Example 3 received no pre-shrinkage treatment in the machine direction (MD). The measured thermal shrinkage rate in the machine direction (MD) and the transverse direction (TD) are apparently higher (with a shrinkage rate in the machine direction (MD) being 1.99%, and a shrinkage rate in the transverse direction (TD) being 1.01%). Furthermore, only 1500 ppm of a nucleating agent was added in the low shrinkage low oligomer polyester films of Comparative Example 3. The improvement of heat resistance is not significant. After the produced low shrinkage low oligomer polyester films were heated at a temperature of 210° C. for 3 hours, the variation in haze (Δhaze) reached 8.66%, and the film surface significantly turns hazy. Furthermore, the low shrinkage low oligomer polyester film products have poor properties in heat resistance. The instability of size after being heated limits the application of low shrinkage low oligomer polyester film products.

Low shrinkage low oligomer polyester films of Comparative Example 4 received no pre-shrinkage treatment in the machine direction (MD). The measured thermal shrinkage rate in the machine direction (MD) and the transverse direction (TD) are apparently higher (with a shrinkage rate in the machine direction (MD) being 2.00%, and a shrinkage rate in the transverse direction (TD) being 1.01%). Furthermore, only 1500 ppm of a flow aid was added in the low shrinkage low oligomer polyester films of Comparative Example 4. The improvement of heat resistance is not significant. After the produced low shrinkage low oligomer polyester films were heated at a temperature of 210° C. for 3 hours, the variation in haze (Δ haze) reached 12.58%, the and film surface significantly turns hazy. Furthermore, the low shrinkage low oligomer polyester film products have poor properties in heat resistance. The instability of size after being heated limits the application of low shrinkage low oligomer polyester film products.

Low shrinkage low oligomer polyester films of Comparative Example 5 received no pre-shrinkage treatment in the machine direction (MD). The measured thermal shrinkage rate in the machine direction (MD) and the transverse direction (TD) are apparently higher (with a shrinkage rate in the machine direction (MD) being 1.58%, and a shrinkage rate in the transverse direction (TD) being 0.92%). Furthermore, 5000 ppm of a primary antioxidative ingredient, 5000 ppm of a secondary antioxidative ingredient, and 1500 ppm of a flow aid were added in the low shrinkage low oligomer polyester films of Comparative Example 5. The heat resistance is improved, but still fails to meet the requirements of production. After the produced low shrinkage low oligomer polyester films were heated at a temperature of 210° C. for 3 hours, the variation in haze (Δhaze) reached 7.37%, and the haze properties in film surface is slightly improved. Furthermore, the low shrinkage low oligomer polyester film products have poor properties in heat resistant. The instability of size after being heated limits the application of low shrinkage low oligomer polyester film products.

One of the beneficial effects of the present disclosure is that, through the technical solutions of "the substrate layer and the surface layer are each formed of a polyester composition that includes specific amounts of a polyester resin, a primary antioxidative ingredient, a secondary antioxidative ingredient, a nucleating agent and a flow aid, and the polyester resin has an intrinsic viscosity between 0.60 dl/g and 0.80 dl/g," the low shrinkage low oligomer polyester film of the present disclosure is capable of preventing oligomers from precipitating on a film surface in a high temperature environment.

The manufacturing method of the low shrinkage low oligomer polyester film of the present disclosure, which is to pre-shrink the low shrinkage low oligomer polyester film in the machine and transverse directions under specific stretch conditions before performing a stretch process, allows the low shrinkage low oligomer polyester film thus produced to have very low heat shrinkage rates of the machine and transverse directions in a high temperature environment, and have a variation in haze (Δhaze) less than 1%.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

The invention claimed is:

1. A manufacturing method of a polyester film, comprising:
   forming at least one polyester composition into an unstretched polyester film, wherein the at least one polyester composition includes:
   94% to 99.974% by weight of a polyester resin having an intrinsic viscosity between 0.60 dl/g and 0.80 dl/g;
   0.01% to 1% by weight of a primary antioxidative agent;
   0.01% to 1% by weight of a secondary antioxidative agent;
   0.003% to 2% by weight of a nucleating agent; and
   0.003% to 2% by weight of a flow aid; and
   stretching the unstretched polyester film in a machine direction (MD) and a transverse direction (TD) at a stretch ratio of 2 to 6 times to form a biaxially stretched polyester film that includes a substrate layer and at least one surface layer formed on the substrate layer;
   wherein a thickness of the biaxially stretched polyester film is between 15 μm and 350 μm, and a thickness of the at least one surface layer is 4% to 15% of the thickness of the biaxially stretched polyester film.

2. The manufacturing method according to claim 1, further comprising pre-shrinking the biaxially stretched polyester film in the machine direction (MD) and/or the transverse direction (TD).

3. The manufacturing method according to claim 1, wherein the unstretched polyester film is sequentially stretched in the machine direction (MD) and the transverse direction (TD), a stretch in the machine direction (MD) is performed at a temperature from 70° C. to 145° C., and a stretch in the transverse direction (TD) is performed at a temperature from 90° C. to 160° C.

4. The manufacturing method according to claim 1, wherein the unstretched polyester film is simultaneously stretched in the machine direction (MD) and the transverse direction (TD) at a stretch ratio of 2 to 6 times and at a temperature from 70° C. to 160° C.

5. The manufacturing method according to claim 2, further comprising: before forming the unstretched polyester film, performing a crystallizing and drying process on the at least one polyester composition at a temperature from 120° C. to 180° C.

6. The manufacturing method according to claim 5, wherein a process time of the crystallizing and drying process is between 3 and 8 hours.

7. The manufacturing method according to claim 1, wherein the at least one polyester composition further includes 0.5% to 2% by weight of slipping agent particles each having a particle size between 1 μm and 5 μm.

8. The manufacturing method according to claim 1, wherein the polyester resin has an intrinsic viscosity between 0.65 dl/g and 0.78 dl/g.

9. A polyester film, comprising:
   a substrate layer; and
   at least one surface layer formed on at least one surface of the substrate layer;
   wherein the substrate layer and the at least one surface layer are each formed of a polyester composition, and the polyester composition includes: wherein the substrate layer and the at least one surface layer are each formed of a polyester composition, and the polyester composition includes:
   94% to 99.974% by weight of a polyester resin having an intrinsic viscosity between 0.60 dl/g and 0.80 dl/g;
   0.01% to 1% by weight of a primary antioxidative agent;
   0.01% to 1% by weight of a secondary antioxidative agent;
   0.003% to 2% by weight of a nucleating agent; and
   0.003% to 2% by weight of a flow aid;
   wherein a thickness of the polyester film is between 15 μm and 350 μm, and a thickness of the at least one surface layer is 4% to 15% of the thickness of the polyester film.

10. The film according to claim 9, wherein the polyester composition forming the at least one surface layer further includes 0.5% to 2% by weight of slipping agent particles each having a particle size between 1 μm and 5 μm.

11. The film according to claim 9, wherein the polyester resin has an intrinsic viscosity between 0.65 dl/g and 0.78 dl/g.

12. The film according to claim 9, wherein the film has a thermal shrinkage rate less than 1% in each of the machine direction (MD) and the transverse direction (TD) at a temperature of 210° C.

* * * * *